(12) United States Patent
Zars (10) Patent No.: US 6,904,697 B2
(45) Date of Patent: Jun. 14, 2005

(54) SYSTEM FOR MARKING AN ARC SEGMENT

(76) Inventor: Leif Alexander Zars, 438 Sandau Rd., San Antonio, TX (US) 78216

( * ) Notice: Subject to any disclaimer, the term of this patent is extended or adjusted under 35 U.S.C. 154(b) by 60 days.

(21) Appl. No.: 10/764,795

(22) Filed: Jan. 26, 2004

(65) Prior Publication Data

US 2004/0163271 A1 Aug. 26, 2004

Related U.S. Application Data

(63) Continuation-in-part of application No. 10/061,482, filed on Feb. 4, 2002, now abandoned.

(51) Int. Cl.$^7$ ................................................ B43L 11/04
(52) U.S. Cl. ........................... 33/760; 33/30.5; 33/30.1; 33/1 G
(58) Field of Search ................................ 33/760, 27.01, 33/27.02, 27.032, 30.1, 30.2, 30.3, 30.4, 30.5, 30.6, 30.7, 31, 1 LE, 1 G, 755, 759, 770, 484, 485

(56) References Cited

U.S. PATENT DOCUMENTS

| | | | |
|---|---|---|---|
| 144,264 A | 11/1873 | Discher | |
| 738,130 A | 9/1903 | Waymire | |
| 1,230,994 A | * 6/1917 | Caldwell | 33/30.5 |
| 2,831,251 A | * 4/1958 | Barker | 33/30.5 |
| 3,039,197 A | * 6/1962 | Abbott | 33/456 |
| 3,066,416 A | * 12/1962 | Gutting | 33/1 F |
| 3,269,015 A | * 8/1966 | Barker | 33/27.08 |
| 3,293,761 A | 12/1966 | Curry | |
| 3,462,843 A | * 8/1969 | Blake | 33/1 H |
| 3,812,587 A | 5/1974 | Elkins et al. | |
| 3,881,255 A | 5/1975 | Pantek | |
| 4,285,135 A | 8/1981 | Minozzi, Jr. | |
| 4,353,167 A | 10/1982 | Martin | |
| 4,381,607 A | * 5/1983 | Place | 33/1 G |
| 4,566,198 A | * 1/1986 | Vitale | 33/759 |
| 4,570,344 A | * 2/1986 | Clegg | 33/30.1 |
| 4,688,331 A | 8/1987 | Shen | |
| 5,123,171 A | * 6/1992 | Langston | 33/30.5 |
| 5,189,800 A | * 3/1993 | Morita et al. | 33/30.1 |
| 5,475,931 A | 12/1995 | Wei | |
| 6,158,137 A | 12/2000 | Bramiett | |
| 6,308,426 B1 | * 10/2001 | Lim | 33/30.5 |

* cited by examiner

Primary Examiner—Diego Gutierrez
Assistant Examiner—Amy R. Cohen
(74) Attorney, Agent, or Firm—Charles W. Hanor, P.C.

(57) ABSTRACT

This device facilitates field marking an arc of a circle having an obstructed center. It comprises a first clamp having a slot to engage a standard tape measure and a second clamp having another slot to engage a color-coded tape measure. A detachable swivel joint snap connects the first clamp to the second clamp, and a handle is connected to the first clamp.

A method is provided to use the device, a standard tape measure, a color-coded tape measure, a rod, and a scribe to mark out such an arc. The method comprises identifying coordinates of an eccentric ellipse, whose foci are field accessible, that will substantially overlap the arc. The two tape measures are anchored to the two foci. The standard tape measure is stretched tight between the two foci while the color-coded tape measure provides a string line for marking out a closely fitting elliptical arc segment.

19 Claims, 12 Drawing Sheets

ELLIPTICAL COORDINATES ASSUMING CHORD LENGTH EQUALS THE RADIUS

| Desired arc coordinates | | Close fit elliptical coordinates | | Accuracy | |
|---|---|---|---|---|---|
| radius of circle of which arc is segment | chord length | Distance from arc midpoint to baseline | Stringline length | Baseline length | +/- 64ths | +/- inches |
| 5 | 5 | 1.875 | 6.5268165 | 5.341987797 | 8.73 | 0.14 |
| 6 | 6 | 2.25 | 7.8321798 | 6.410385357 | 10.47 | 0.16 |
| 7 | 7 | 2.625 | 9.1375431 | 7.478782916 | 12.22 | 0.19 |
| 8 | 8 | 3 | 10.4429064 | 8.547180475 | 13.96 | 0.22 |
| 9 | 9 | 3.375 | 11.7482697 | 9.615578035 | 15.71 | 0.25 |
| 10 | 10 | 3.75 | 13.053633 | 10.68397559 | 17.45 | 0.27 |
| 11 | 11 | 4.125 | 14.3589963 | 11.75237315 | 19.20 | 0.30 |
| 12 | 12 | 4.5 | 15.6643596 | 12.82077071 | 20.94 | 0.33 |
| 13 | 13 | 4.875 | 16.9697229 | 13.88916827 | 22.69 | 0.35 |
| 14 | 14 | 5.25 | 18.2750862 | 14.95756583 | 24.43 | 0.38 |
| 15 | 15 | 5.625 | 19.5804495 | 16.02596339 | 26.18 | 0.41 |
| 16 | 16 | 6 | 20.8858128 | 17.09436095 | 27.92 | 0.44 |
| 17 | 17 | 6.375 | 22.1911761 | 18.16275851 | 29.67 | 0.46 |
| 18 | 18 | 6.75 | 23.4965394 | 19.23115607 | 31.41 | 0.49 |
| 60 | 60 | 22.5 | 78.321798 | 64.10385357 | 104.70 | 1.64 |
| 100 | 100 | 37.5 | 130.53633 | 106.8397559 | 174.50 | 2.73 |

Fig. 5

FORMULAS USED TO COMPUTE THE ELLIPTICAL COORDINATES OF FIG. 5

| Desired arc coordinates | | Close fit elliptical coordinates | | Accuracy | |
|---|---|---|---|---|---|
| radius | chord length | Distance from arc midpoint to baseline | Stringline length | Baseline length | +/- 64ths | +/- inches |
| 5 | =A3 | =A3*0.375 | =A3*1.3053633 | =2*((D3/2)^2-(C3)^2)^0.5 | =A3*1.745 | =F3/64 |
| 6 | =A4 | =A4*0.375 | =A4*1.3053633 | =2*((D4/2)^2-(C4)^2)^0.5 | =A4*1.745 | =F4/64 |
| 7 | =A5 | =A5*0.375 | =A5*1.3053633 | =2*((D5/2)^2-(C5)^2)^0.5 | =A5*1.745 | =F5/64 |
| 8 | =A6 | =A6*0.375 | =A6*1.3053633 | =2*((D6/2)^2-(C6)^2)^0.5 | =A6*1.745 | =F6/64 |
| 9 | =A7 | =A7*0.375 | =A7*1.3053633 | =2*((D7/2)^2-(C7)^2)^0.5 | =A7*1.745 | =F7/64 |
| 10 | =A8 | =A8*0.375 | =A8*1.3053633 | =2*((D8/2)^2-(C8)^2)^0.5 | =A8*1.745 | =F8/64 |
| 11 | =A9 | =A9*0.375 | =A9*1.3053633 | =2*((D9/2)^2-(C9)^2)^0.5 | =A9*1.745 | =F9/64 |
| 12 | =A10 | =A10*0.375 | =A10*1.3053633 | =2*((D10/2)^2-(C10)^2)^0.5 | =A10*1.745 | =F10/64 |
| 13 | =A11 | =A11*0.375 | =A11*1.3053633 | =2*((D11/2)^2-(C11)^2)^0.5 | =A11*1.745 | =F11/64 |
| 14 | =A12 | =A12*0.375 | =A12*1.3053633 | =2*((D12/2)^2-(C12)^2)^0.5 | =A12*1.745 | =F12/64 |
| 15 | =A13 | =A13*0.375 | =A13*1.3053633 | =2*((D13/2)^2-(C13)^2)^0.5 | =A13*1.745 | =F13/64 |
| 16 | =A14 | =A14*0.375 | =A14*1.3053633 | =2*((D14/2)^2-(C14)^2)^0.5 | =A14*1.745 | =F14/64 |
| 17 | =A15 | =A15*0.375 | =A15*1.3053633 | =2*((D15/2)^2-(C15)^2)^0.5 | =A15*1.745 | =F15/64 |
| 18 | =A16 | =A16*0.375 | =A16*1.3053633 | =2*((D16/2)^2-(C16)^2)^0.5 | =A16*1.745 | =F16/64 |
| 60 | =A17 | =A17*0.375 | =A17*1.3053633 | =2*((D17/2)^2-(C17)^2)^0.5 | =A17*1.745 | =F17/64 |
| 100 | =A18 | =A18*0.375 | =A18*1.3053633 | =2*((D18/2)^2-(C18)^2)^0.5 | =A18*1.745 | =F18/64 |

Fig. 6

ELLIPTICAL COORDINATES ASSUMING CHORD LENGTH EQUALS 75% OF THE RADIUS

| Desired Arc Coordinates | | Close Fit Elliptical Coordinates | | | Accuracy | |
|---|---|---|---|---|---|---|
| radius of circle of which arc is a segment | chord length | Distance from midpoint to baseline | Stringline length | Baseline length | +/- 64ths | +/- inches |
| 5 | 3.750937734 | 1.875 | 6.326558 | 5.0953739 | 2.36 | 0.04 |
| 6 | 4.501125281 | 2.25 | 7.59187 | 6.1144488 | 2.83 | 0.04 |
| 7 | 5.251312828 | 2.625 | 8.857181 | 7.1335236 | 3.30 | 0.05 |
| 8 | 6.001500375 | 3 | 10.12249 | 8.1525984 | 3.77 | 0.06 |
| 9 | 6.751687922 | 3.375 | 11.3878 | 9.1716732 | 4.25 | 0.07 |
| 10 | 7.501875469 | 3.75 | 12.65312 | 10.190748 | 4.72 | 0.07 |
| 11 | 8.252063016 | 4.125 | 13.91843 | 11.209823 | 5.19 | 0.08 |
| 12 | 9.002250563 | 4.5 | 15.18374 | 12.228898 | 5.66 | 0.09 |
| 13 | 9.75243811 | 4.875 | 16.44905 | 13.247972 | 6.13 | 0.10 |
| 14 | 10.50262566 | 5.25 | 17.71436 | 14.267047 | 6.60 | 0.10 |
| 15 | 11.2528132 | 5.625 | 18.97967 | 15.286122 | 7.08 | 0.11 |
| 16 | 12.00300075 | 6 | 20.24499 | 16.305197 | 7.55 | 0.12 |
| 17 | 12.7531883 | 6.375 | 21.5103 | 17.324272 | 8.02 | 0.13 |
| 18 | 13.50337584 | 6.75 | 22.77561 | 18.343346 | 8.49 | 0.13 |
| 60 | 45.00112503 | 22.5 | 75.9187 | 61.144488 | 28.30 | 0.44 |
| 100 | 75.01815469 | 37.5 | 126.5312 | 101.90748 | 47.17 | 0.74 |

Fig. 7

FORMULAS USED TO COMPUTE THE ELLIPTICAL COORDINATES OF FIG. 7

| Desired arc coordinates | | Close fit elliptical coordinates | | | Accuracy | |
|---|---|---|---|---|---|---|
| radius | chord length | Distance from arc midpoint to baseline | Stringline length | Baseline length | +/- 64ths | +/- inches |
| 5 | =A3/1.333 | =A3*0.375 | =A3*1.3053633 | =2*((D3/2)^2-(C3)^2)^0.5 | =A3*1.745 | =F3/64 |
| 6 | =A4/1.333 | =A4*0.375 | =A4*1.3053633 | =2*((D4/2)^2-(C4)^2)^0.5 | =A4*1.745 | =F4/64 |
| 7 | =A5/1.333 | =A5*0.375 | =A5*1.3053633 | =2*((D5/2)^2-(C5)^2)^0.5 | =A5*1.745 | =F5/64 |
| 8 | =A6/1.333 | =A6*0.375 | =A6*1.3053633 | =2*((D6/2)^2-(C6)^2)^0.5 | =A6*1.745 | =F6/64 |
| 9 | =A7/1.333 | =A7*0.375 | =A7*1.3053633 | =2*((D7/2)^2-(C7)^2)^0.5 | =A7*1.745 | =F7/64 |
| 10 | =A8/1.333 | =A8*0.375 | =A8*1.3053633 | =2*((D8/2)^2-(C8)^2)^0.5 | =A8*1.745 | =F8/64 |
| 11 | =A9/1.333 | =A9*0.375 | =A9*1.3053633 | =2*((D9/2)^2-(C9)^2)^0.5 | =A9*1.745 | =F9/64 |
| 12 | =A10/1.333 | =A10*0.375 | =A10*1.3053633 | =2*((D10/2)^2-(C10)^2)^0.5 | =A10*1.745 | =F10/64 |
| 13 | =A11/1.333 | =A11*0.375 | =A11*1.3053633 | =2*((D11/2)^2-(C11)^2)^0.5 | =A11*1.745 | =F11/64 |
| 14 | =A12/1.333 | =A12*0.375 | =A12*1.3053633 | =2*((D12/2)^2-(C12)^2)^0.5 | =A12*1.745 | =F12/64 |
| 15 | =A13/1.333 | =A13*0.375 | =A13*1.3053633 | =2*((D13/2)^2-(C13)^2)^0.5 | =A13*1.745 | =F13/64 |
| 16 | =A14/1.333 | =A14*0.375 | =A14*1.3053633 | =2*((D14/2)^2-(C14)^2)^0.5 | =A14*1.745 | =F14/64 |
| 17 | =A15/1.333 | =A15*0.375 | =A15*1.3053633 | =2*((D15/2)^2-(C15)^2)^0.5 | =A15*1.745 | =F15/64 |
| 18 | =A16/1.333 | =A16*0.375 | =A16*1.3053633 | =2*((D16/2)^2-(C16)^2)^0.5 | =A16*1.745 | =F16/64 |
| 60 | =A17/1.333 | =A17*0.375 | =A17*1.3053633 | =2*((D17/2)^2-(C17)^2)^0.5 | =A17*1.745 | =F17/64 |
| 100 | =A18/1.333 | =A18*0.375 | =A18*1.3053633 | =2*((D18/2)^2-(C18)^2)^0.5 | =A18*1.745 | =F18/64 |

SYSTEM FOR MARKING AN ARC SEGMENT

RELATED APPLICATIONS

This application is a continuation-in-part of and claims benefit to U.S. patent application Ser. No. 10/061,482, filed on Feb. 4, 2002, now abandoned, entitled "A Device for and Method of Field Laying Out of a Radius When a Radius Point is Not Available."

FIELD OF THE INVENTION

Applicant's invention relates to a device for and method of marking out an arc segment when a focal point is not available.

BACKGROUND OF THE INVENTION

Oftentimes when a contractor is asked to design a configuration such as an addition to a building or a swimming pool having a curved profile, the focal point of the arc segment defining the curved portion is available and accessible to mark out the curved portion. Under such circumstances, the contractor can access the focal point to plot out the curved portion of the new structure and design accordingly. Unfortunately, there are many instances where an obstacle obstructs access to the focal point. In these cases the obstacle presents difficulties in accurately laying out the desired arc segment. Presently, there are no satisfactory devices or procedures to facilitate the geometric construction of an arc segment when the focal point is unavailable, such as where a building or other obstacle is in the way of reaching the focal point.

SUMMARY OF THE INVENTION

It is an object of the present invention to provide a novel device for field laying out of an arc segment when the center of the circle of which the arc is a segment is unavailable.

It is another object of the present invention to provide a novel method of field laying out of an arc segment when the center of the circle of which the arc is a segment is unavailable.

In satisfaction of these and related objectives, Applicant's present invention provides a device and method for field laying out of an arc segment. Applicant's invention permits its practitioner to lay out an arc segment when the center of the circle of which the arc is a segment is unavailable.

In particular, a method is provided to approximately field mark an arc of a circle having an obstructed center. An eccentric ellipse is identified that will substantially overlap the arc, the ellipse having a first focus and a second focus, both of which are field accessible. Two line indicating means are obtained comprising, for example, a standard tape measuring instrument and a color-coded tape measure, two standard tape measuring instruments, or two strings. A reference point on a first line is placed at or near the first focus. The reference point may be anchored to the first focus with a rod. A second point on the first line, separated from the reference point by a distance equal to the distance between the first focus and the second focus of the ellipse, is placed at or near the second focus. A reference point on a second line is also placed at or near the first focus. A second point on the second line, separated from the second line's reference point by a distance equal to the major axis length of the ellipse is also placed at or near the second focus. The second line is drawn tight at a plurality of points on the ellipse where the ellipse substantially overlaps the arc; and these points are marked with a marking instrument such as a scribe.

This method may further comprise a calibration step involving pulling the second line toward an endpoint of the arc, and then toward the opposite endpoint, but not at the same time; and moving the first line toward or away from the chord of the arc, while keeping the first line centered and parallel to the chord, until the first line is in a position where the step of pulling the second line toward either the first or second endpoint will pull the second line tight.

A device is also provided to facilitate field marking an arc of a circle having an obstructed center. The device comprises a first clamp having a first slot to engage a first measuring instrument and a second clamp having a second slot to engage a second measuring instrument; wherein the second clamp is connected to the first clamp. A handle is preferably connected to the first clamp. A detachable swivel joint, such as a snap, preferably connects the first clamp to the second clamp.

One of the measuring instruments is preferably a standard tape measure with conventional metric or English-system markings and a length of 100 feet while the other measuring instrument is preferably a color-coded tape measure with a length of 100 feet. On each side of the color-coded tape measure there are set intervals which correspond to the predetermined distances for the major axis length of the ellipse for circular arc segments of various radii.

Furthermore, a method is provided to approximately mark an arc on a field using two measuring instruments (e.g., a standard tape measure and a color-coded tape measure, two standard tape measures, or two strings), where the arc is delimited by two endpoints, and the arc is part of a circle having an obstructed center. The method comprises identifying coordinates of an eccentric ellipse that will substantially overlap the arc, the ellipse having two foci, both of which are field accessible; anchoring the starting point on each of the two measuring instruments to a first field location (i.e., the first focus of the two ellipse foci); extending the first of the two measuring instruments to a second field location (i.e., the second focus of the two ellipse foci) separated from the first field location by a distance equal to the distance between the two foci of the ellipse, wherein the first and second field locations define points on a line that runs parallel to a chord which connects the endpoints of the arc; extending the second of the two measuring instruments to a length that is equal to the distance of the ellipse's major axis; clamping the second measurement instrument to the second field location; and pulling a marking instrument along and against the second measuring instrument to mark out the arc.

BRIEF DESCRIPTION OF THE DRAWINGS

FIG. 8 depicts a table of formulas used to compute the elliptical coordinates of FIG. 7.

DETAILED DESCRIPTION

Figure 1:
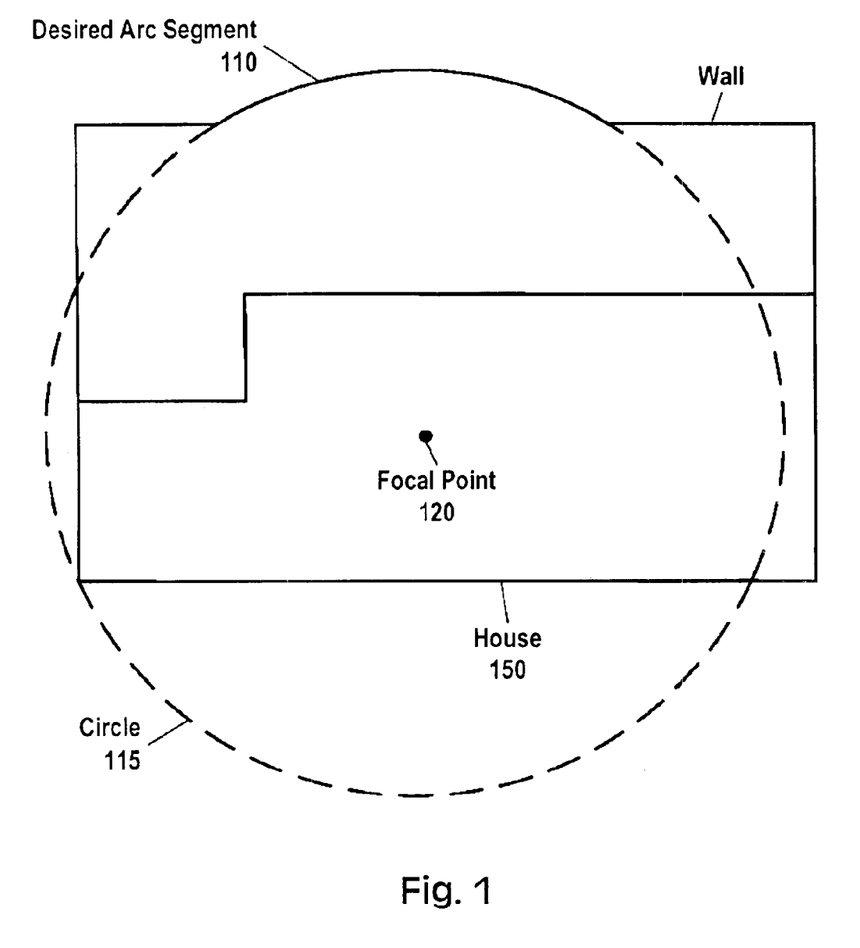
FIG. 1 is a plan view illustrating a design situation where the center of the circle of which a desired circular arc is a segment is obstructed by an obstacle in the field.
Figure 2:
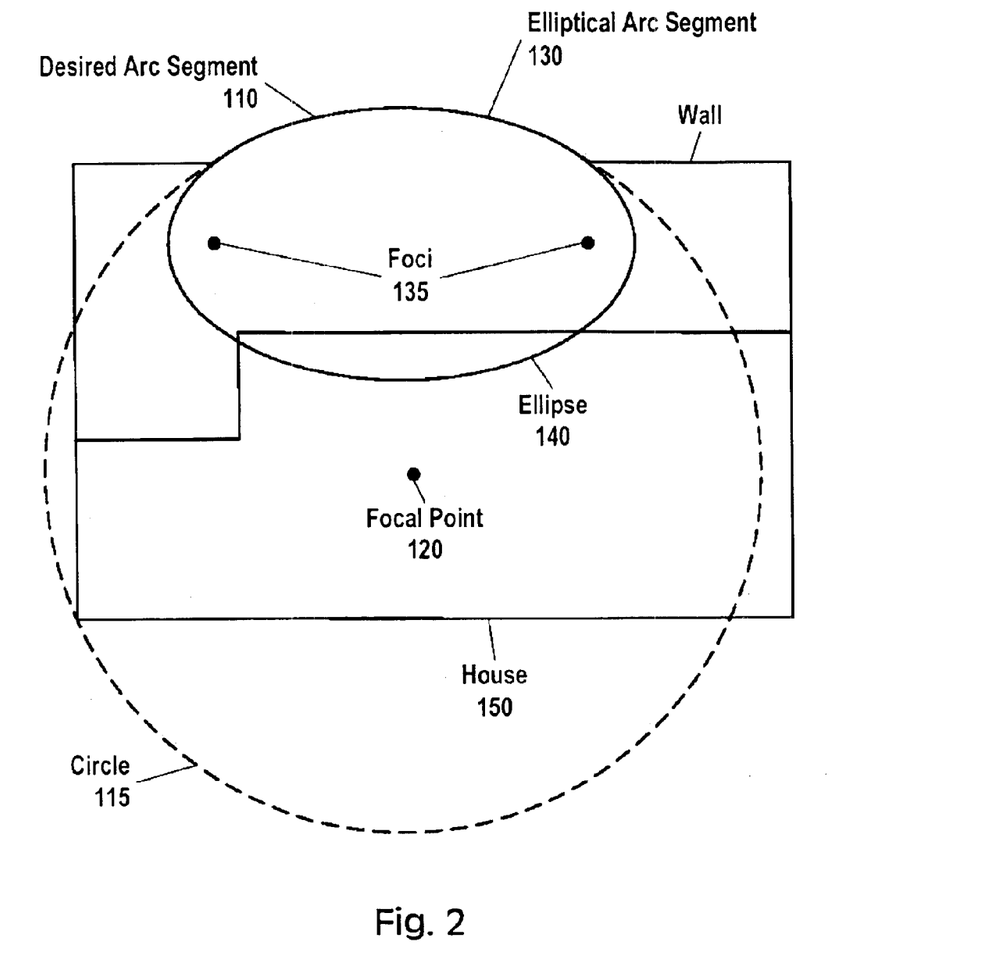
FIG. 2 is a plan view illustrating an ellipse, whose foci are field accessible, which can be used to approximate the desired circular arc segment of FIG. 1.

FIG. 1 illustrates the difficulty contractors frequently face in laying out a circular arc segment 10 having a focal point 120 that is obstructed by an object such as a house 150. For such situations, Applicant has invented a method and device to lay out an elliptical arc segment 130 (see FIG. 2) that closely approximates the desired circular arc segment 110. Applicants' invention capitalizes on the fact that a significant arc portion of an ellipse is approximately circular, as illustrated in FIGS. 2–4.

For example, assume that a contractor desires to lay out a 60-foot radius circular arc segment having a chord length of 60 feet. (A "chord" is commonly defined as "a line segment that joins two points on a curve"). Those of ordinary skill in the art will appreciate that such an arc segment would span 60 degrees of a 60-foot radius circle. Also assume that the center of such a 60-foot circle 115 is in the middle of a house 150, thereby obstructing a contractor from connecting a string line to the center or focal point 120 to plot out the desired arc segment 110.

In accordance with one embodiment of the invention, this problem is overcome by plotting an elliptical arc segment 130 that closely approximates the desired circular arc segment 110. In FIG. 2, it can be seen that the foci 135 of the ellipse 140, unlike the center point 120 of the circle 115, are not obstructed by the house 150. In accordance with Applicants' invention, the foci 135 of the ellipse 140, rather than the center point 120 of the circle 115, are used to approximate the desired circular arc segment 110.

Figure 3:
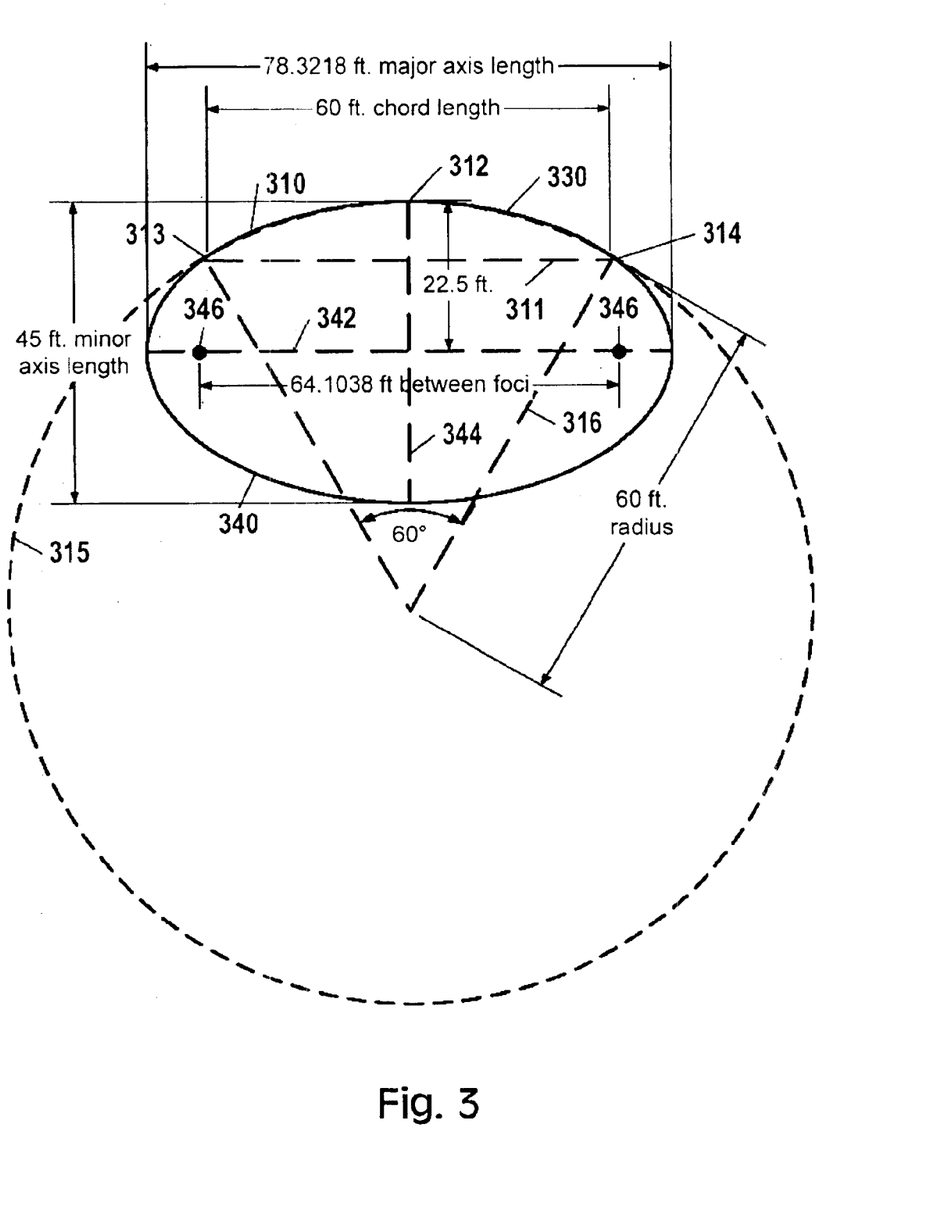
FIG. 3 is a schematic representation of the dimensions and coordinates of an ellipse that closely fits a 60-foot chord length arc segment of a circle of radius 60 feet.
Figure 4:
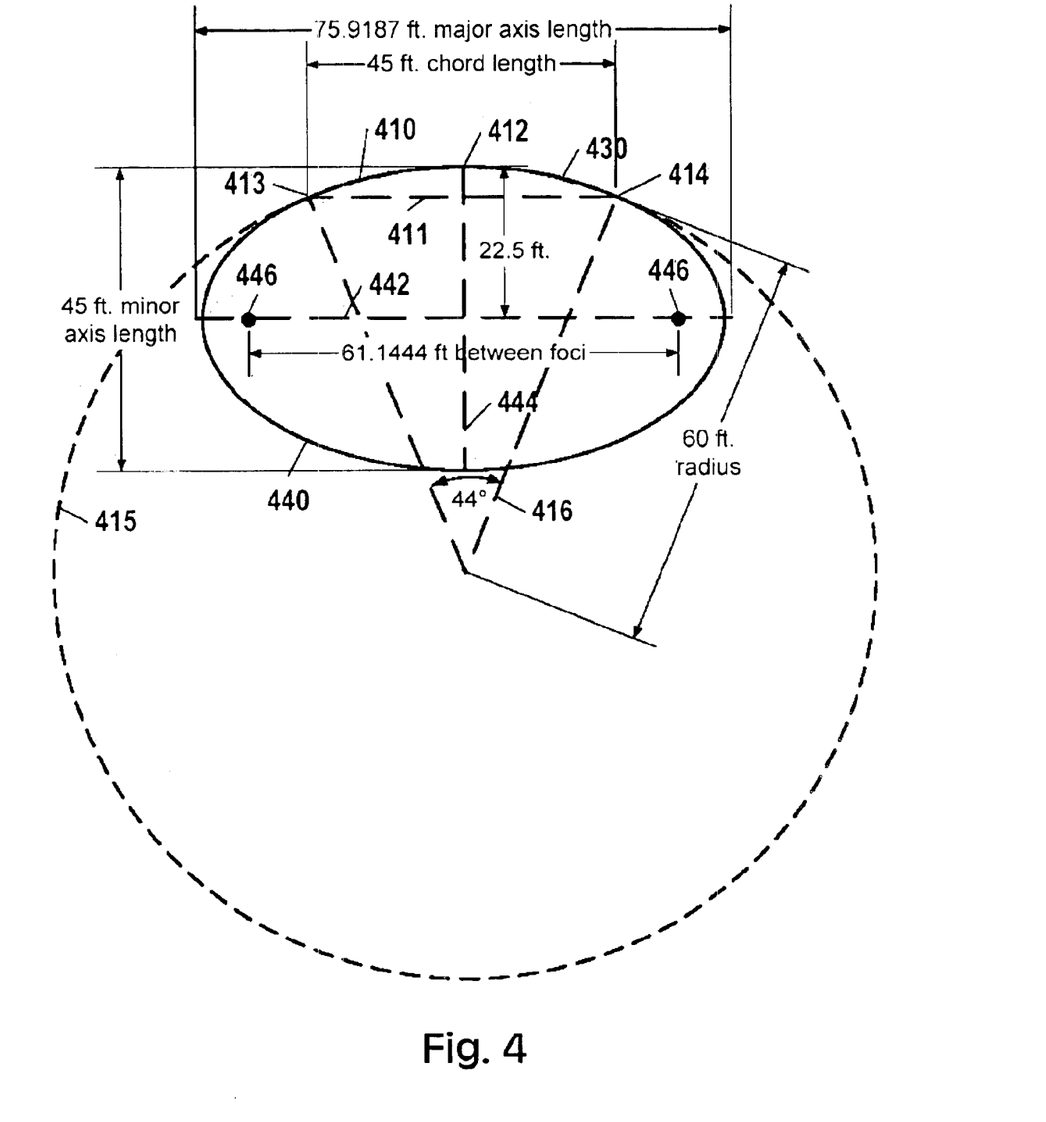
FIG. 4 is a schematic representation of the dimensions and coordinates of an ellipse that closely fits a 45-foot chord length arc segment of a circle of radius 60 feet.

FIGS. 3–4 illustrate the dimensions of elliptical arc segments 330, 430 that closely overlap a desired circular arc segment 310, 410 along the long sides of the ellipse 340, 440. In each of FIGS. 3–4, the ellipse 340, 440 intersects the desired circular arc segment 310, 410 approximately at the midpoint 312, 412 of the desired circular arc segment 310, 410. Also, in each of FIGS. 3–4, the major axis 342, 442 of the ellipse 340, 440 lies parallel to the chord of the desired circular arc segment 310, 410.

Figure 5:
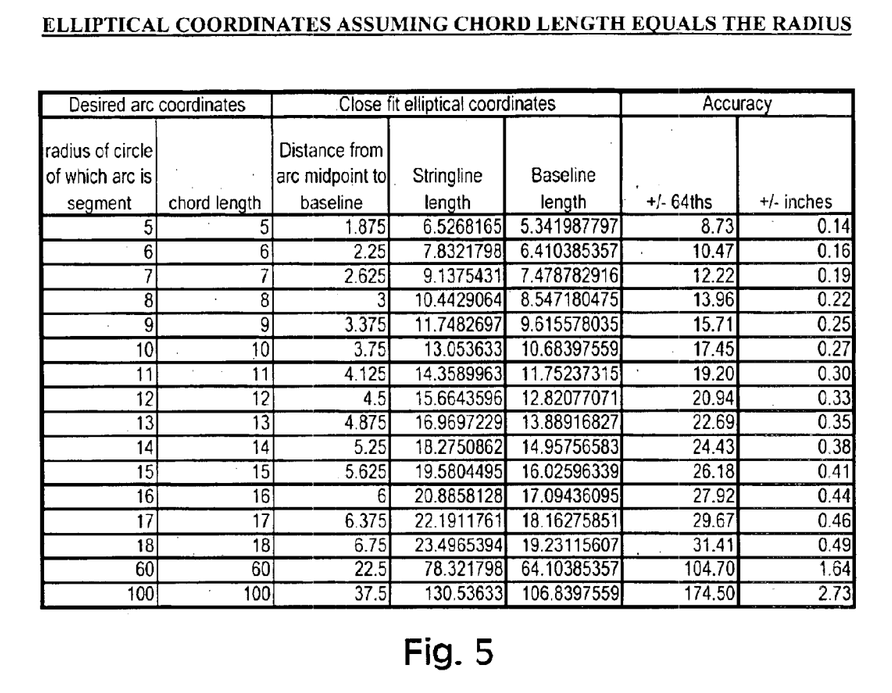
FIG. 5 depicts a table of elliptical coordinates that may be used to provide a close fit to circular arc segments of various radii, assuming that the chord length equals the radius.
Figure 6:
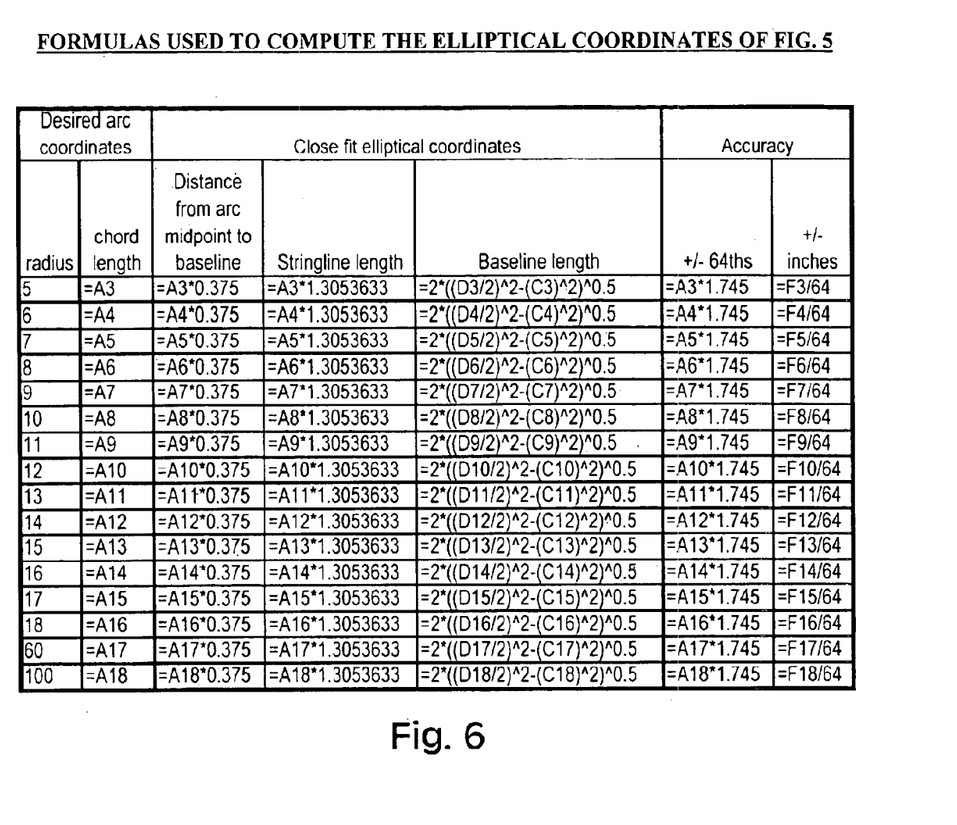
FIG. 6 depicts a table of formulas used to compute the elliptical coordinates of FIG. 5.

It was found that the arc 330 of a 60-foot chord of an ellipse 340 with a minor axis 344 of 75% of the 60-foot radius 316 (45 feet), and a major axis 342 of 1.3053633 times the 60-foot radius 316 (78.3218 feet) would closely fit the arc 310 of a 60-foot chord 311 on a circle 315 having a 60-foot radius 316. Assuming that the ellipse 340 intersects the circle 315 at the midpoint 312 of the circular arc segment 310, the endpoints of such an elliptical arc segment 330 would be spaced only 0.2727 feet (3.27 inches) apart from the endpoints 313, 314 of the desired circular arc segment 310. It will be appreciated that if the midpoint of elliptical arc segment 330 is set 1.64 inches away from the midpoint 312 of the circular arc segment. 310, the overall error of the elliptical curve fit is ±1.64 inches. FIG. 3 depicts such an ellipse 340 superimposed on a 60-foot-radius circle 315. FIGS. 5 and 6, which are explained further below, show spreadsheets depicting the formulas used and results yielded by extrapolating these relationships to a whole range of different arc radii.

Figure 7:
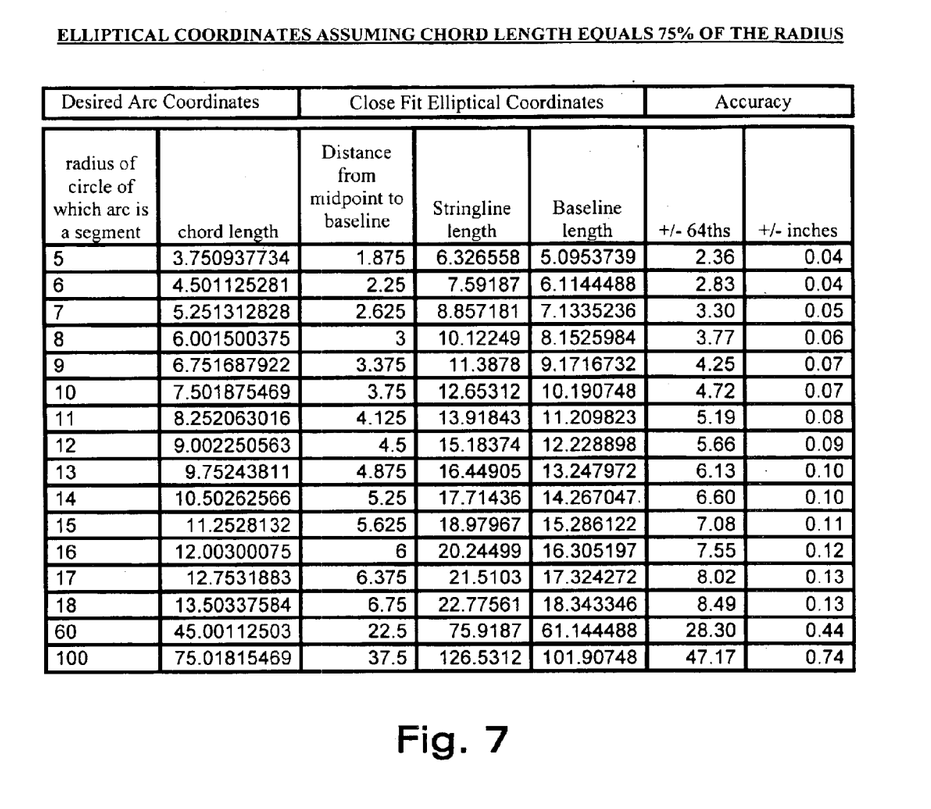
FIG. 7 depicts a table of elliptical coordinates that may be used to provide a close fit to circular arc segments of various radii, assuming that the chord length equals 75% of the radius.

It was also found that the arc 430 of a 45-foot chord 411 on an ellipse 440 with a minor axis 444 of 75% of the 60-foot radius 416 (45 feet), and a major axis 442 of 1.2653116 times the 60-foot radius 416 (75.9187 feet) would closely fit the arc 410 of a 45-foot chord 411 on a circle 415 having a 60-foot radius 416. (Those of ordinary skill in the art will appreciate that such an arc segment would span approximately 44 degrees of a 60-foot radius circle). Assuming that the ellipse 440 intersects the circle 415 at the midpoint 412 of the circular arc segment 410, the endpoints of such an elliptical arc segment 430 would be spaced only 0.0737 feet (0.88 inches) apart from the endpoints 413, 414 of the desired circular arc segment 410. It will be appreciated that if the midpoint of elliptical arc segment is set 0.44 inches away from the midpoint 412 of the circular arc segment, the overall error of the elliptical curve fit is ±0.44 inches. FIG. 4 depicts such an ellipse 440 superimposed on a 60-foot-radius circle 415. FIGS. 7 and 8, which are explained further below, show spreadsheets depicting the formulas used and results yielded by extrapolating these relationships to a whole range of different arc radii.

As evident from FIGS. 3 and 4, an ellipse whose minor axis has a length equal to 75% of the radius of the circle of which the arc is a segment will be suitable for many construction tasks. FIGS. 5–8 extrapolate this relationship by depicting preferred baseline and string length dimensions for approximating circular arc segments for a range of different arc radii and chord lengths. FIG. 5 depicts the dimensions preferred for 60-degree arc segments having radii ranging from 5 to 100 feet. FIG. 7 depicts the dimensions preferred for 44-degree arc segments having a chord length that is equal to 75% of the radius length which ranges from 5 to 100 feet. FIGS. 6 and 8 depict the spreadsheet formulas used to compute the values depicted in FIGS. 5 and 7, respectively.

In addition, FIGS. 5 and 7 also illustrate the difference in accuracy between the coordinates of the 60-degree arc segment when assuming the chord length equals the length of the radius as compared to the coordinates of the 44-degree arc segment when assuming the chord length is equal to 75% of the radius length. As seen from FIGS. 5 and 7, when using a chord length that is equal to 75% of the radius length the 44-degree arc segment coordinates are four times as accurate as they are when using a 60-degree arc segment with a chord length that is equal to the length of the radius. Persons with ordinary skill in the art will appreciate that the dimensions of the 60-degree arc segments can be used for exterior site layout work while the dimensions of the 44-degree arc segments with a chord length equal to 75% of the radius length can be used for interior work such as archways in buildings when a high degree of accuracy is required.

Figure 9:
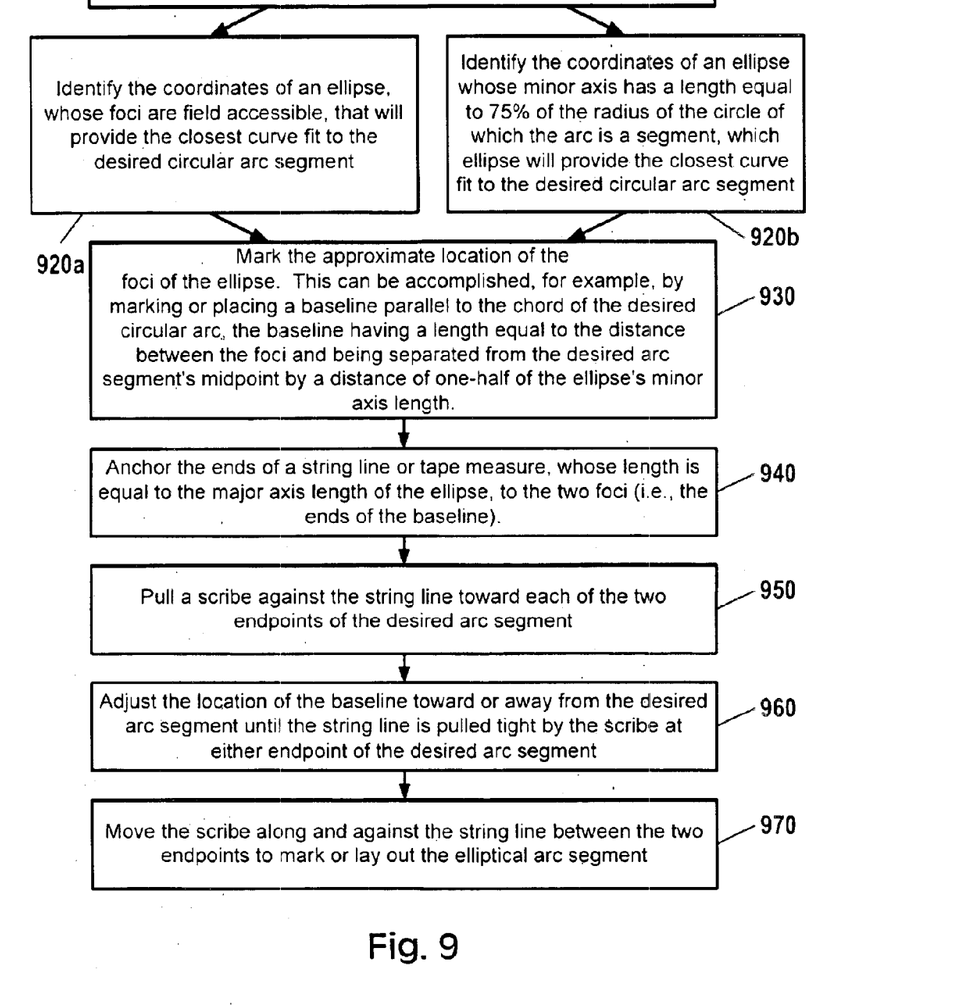
FIG. 9 is a flow chart of a method to approximately lay or mark out a desired circular arc segment in the field using the principles of this invention.

FIG. 9 sets forth a flow chart of a method to approximately lay or mark out a desired circular arc segment in the field using the principles of this invention. In block 910, the chord length and radius of the desired circular arc segment are determined. In block 920a, a computation or identification is made of the coordinates of an ellipse, whose foci will be field accessible, which will provide the closest curve fit to the desired circular arc segment.

Those of ordinary skill in the art of computer programming or geometric calculus will understand how to implement iterative techniques or derive formulas to determine which elliptical coordinates (e.g., major axis length, focal coordinates) will provide the best fitting elliptical arc segment assuming that the following variables are known: the chord length of the desired arc segment, the radius of the circle of which the desired arc is a segment, and the set of possible ellipses whose foci would be field accessible. Using such techniques, the disclosed invention can be used to find the best elliptical coordinates for any set of arc radii and chord lengths. Indeed, a computer program may be provided to enable those in the field to quickly find the best-fitting ellipse whose foci are field accessible.

It is not necessary that brute-force calculations be performed in every case. In many field situations, an ellipse with a fixed minor-axis-length-to-major-axis-length ratio or a fixed minor-axis-length-to-circle-radius ratio will provide an adequate curve fit. In such situations, an alternative way to identify curve-fitting elliptical coordinates may be provided. For example, in block 920b, elliptical coordinates are identified based on the assumption that an ellipse whose minor axis has a length equal to 75% of the radius of the circle of which the arc is a segment will provide an adequate elliptical curve fit. Applying this assumption, persons in the field can identify the coordinates of an adequate curve-fitting ellipse by looking up the values in a table like those depicted in FIG. 5 or 7, or by using formulas like those displayed in FIGS. 6 and 8.

In block 930, the approximate locations of the ellipse's foci are marked out in the field. This can be accomplished, for example, by marking or placing a baseline equal to the distance between the foci at a distance from the circular arc's midpoint equal to approximately one-half of the ellipse's minor axis length. Of course, the baseline should also be laid out approximately parallel to the chord of the desired arc segment, and the minor axis of the ellipse should pass through the midpoint of the baseline (this is done to ensure that the baseline is centered).

In block 940, the ends of the measuring instrument whose length is equal to the major axis length of the ellipse, is anchored to the two foci (or the ends of the baseline).

In blocks 950 and 960, the position of the baseline is calibrated by pulling a scribe against the string line toward one endpoint of the desired arc segment, and then the other endpoint. While at all times keeping the baseline centered and parallel to the chord, the baseline is moved toward or away from the chord until the baseline is in a position that will cause the measuring instrument to be pulled tight by the scribe at either endpoint of the desired arc segment.

In block 960, the scribe is pulled along and against the measuring instrument to lay or mark out an elliptical arc segment that closely approximates the desired circular arc segment.

Figure 10:
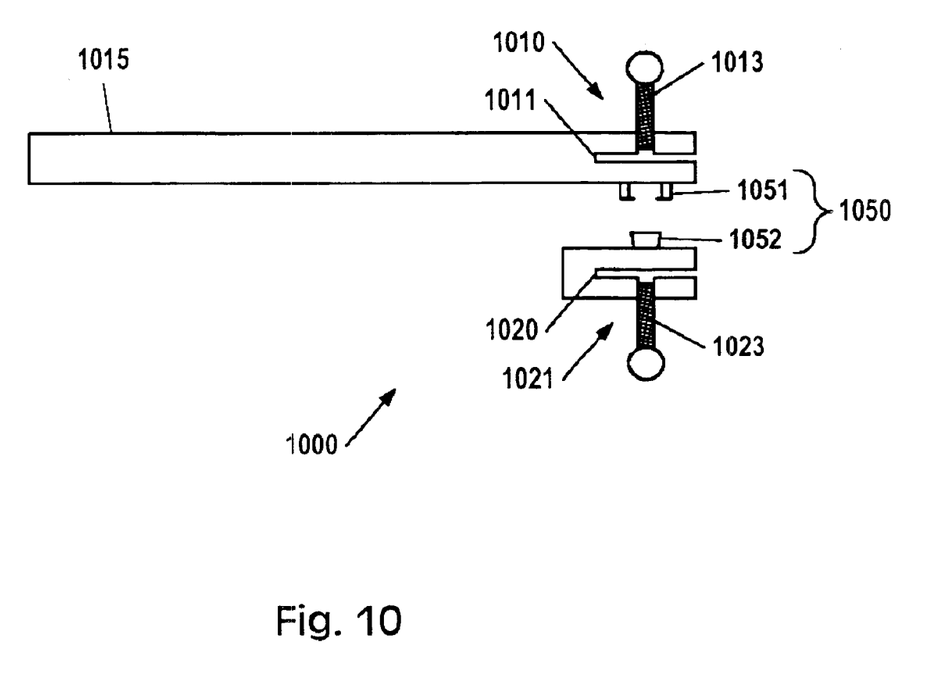
FIG. 10 depicts a device for field laying out an arc segment when a focal point for the arc segment is unavailable.

FIG. 10 depicts a device 1000 for field laying out an arc segment when a focal point for the arc segment is unavailable. Device 1000 comprises first and second clamps 1010 and 1020 for clamping the first and second measuring instruments 1030 and 1040. First and second clamps 1010 and 1020 each have slots 1011, 1021 for receiving the measuring instruments 1030 and 1040. Protruding through slots 1011 and 1021 are threaded screw holes 1012 and 1022, respectively, for receiving screws 1013 and 1023. Each screw 1013, 1023 can be tightened to hold, or loosened to disengage, the corresponding measuring instrument 1030 or 1040.

A handle 1015, designed and operable to be hand-held by a contractor in the field, is attached to the first clamp 1010. The second clamp 1020 is pivotally mated to the first clamp 1010 using a swivel joint 1050 such as a snap, wherein the female portion 1051 of the joint 1050 is connected to the first clamp 1010, and the male portion 1052 of the joint 1050 is connected to the second clamp 1020. The swivel joint 1050 allows the second measuring instrument 1040 to move freely in relation to the first measuring instrument 1030.

In operation, the first measuring instrument 1030 is preferably used to mark the baseline of the ellipse that is used to approximate the circular arc segment. The second measuring instrument 1040 is preferably used as a string line to mark out the elliptical arc segment (see discussion on FIG. 9).

The first measuring instrument 1030 is preferably a standard tape measure with a length of up to 100 feet and conventional metric or English-system markings. The second measuring instrument 1040 is preferably color-coded with each side having intervals that correspond to the predetermined distances for the major axis length of the ellipse for circular arc segments of various radii. The intervals on each side of the color-coded tape measure identify the various desired circle radii. For example, an interval marked as R25'-2" will correspond to the predetermined distance for the major axis length of the ellipse for a desired circular arc segment having a radius of 25 feet and 2 inches.

The color-coded tape measure is preferably red on one side and green on the other. The green side represents the distances that are predetermined for an elliptical arc segment when assuming that the chord length is equal to the radius of the arc segment. The red side represents the distances that are predetermined for an elliptical arc segment when assuming that the chord length is equal to 75% of the arc segment radius. The green side would be used for exterior site layout work when only a normal degree of accuracy is required. The red side would be used for interior work such as archways in buildings when a high degree of accuracy is required.

The length of the first measuring instrument 1030 and the second measuring instrument 1040 are preferably 100 feet each. However, when using Applicant's device and method for field marking an arc of a circle where the radius of the circle is greater than 76 feet, the first measuring instrument 1030 and the second measuring instrument 1040 must each be greater than 100 feet in length. For example, as seen in FIG. 7, the stringline length (i.e., the distance of the major axis of the ellipse) needed for field marking an arc of a circle with a radius of 100 feet is 130.53633 feet and the baseline length (i.e., the distance between the two foci of the ellipse) is 106.8397559 feet. Thus, it is necessary that the first measuring instrument 1030 and the second measuring instrument 1040 used for field marking an arc of a circle having a radius of 100 feet must have lengths of at least 107 feet and 131 feet, respectively. Such adjustments in the length of the measuring instruments 1030 and 1040 should be considered as one of the various embodiments of the Applicant's device.

Figure 11:
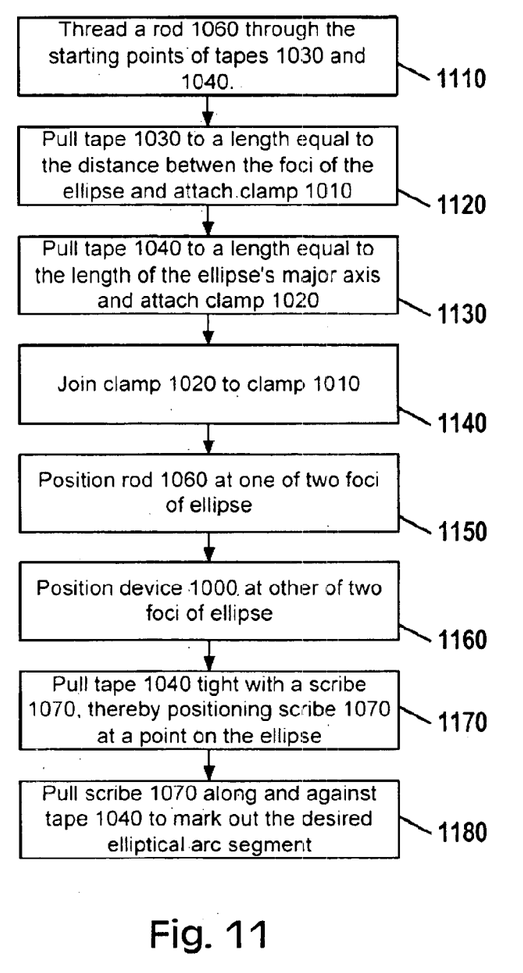
FIG. 11 is a flow chart of a method for using the device of FIG. 10 to mark out an elliptical arc segment.
Figure 12:
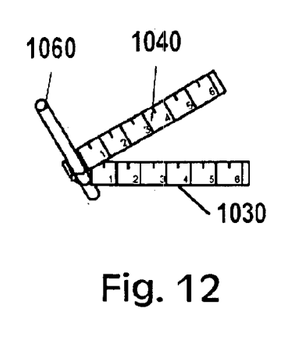
FIG. 12 illustrates the rod-threading step of FIG. 11.
Figure 13:
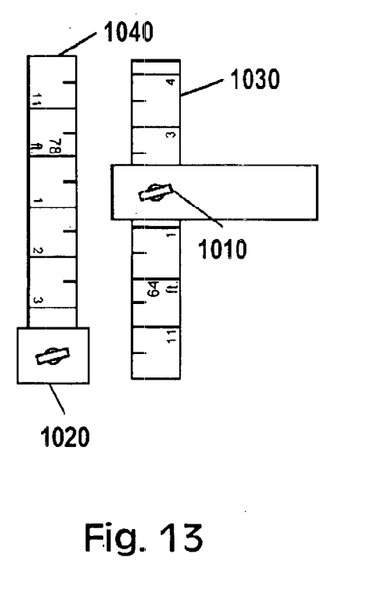
FIG. 13 illustrates the clamping steps of FIG. 11.
Figure 14:
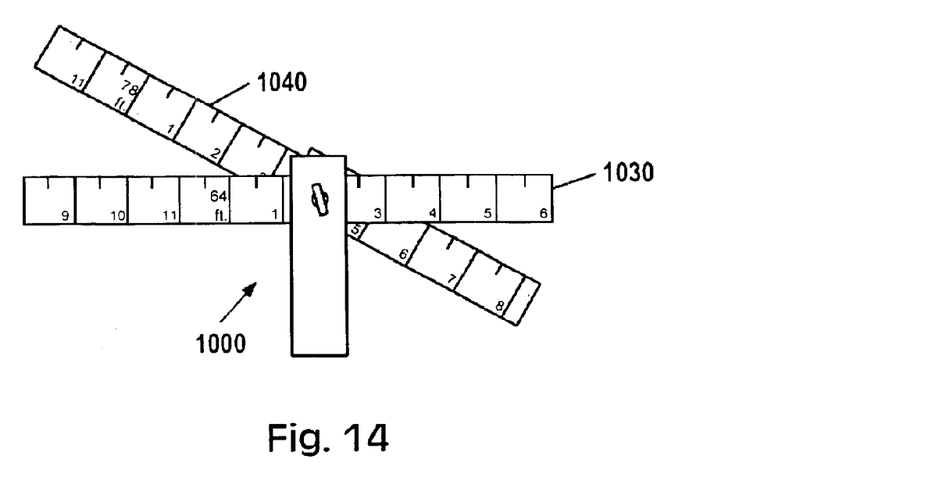
FIG. 14 illustrates the clamp-connecting step of FIG. 11.
Figure 15:
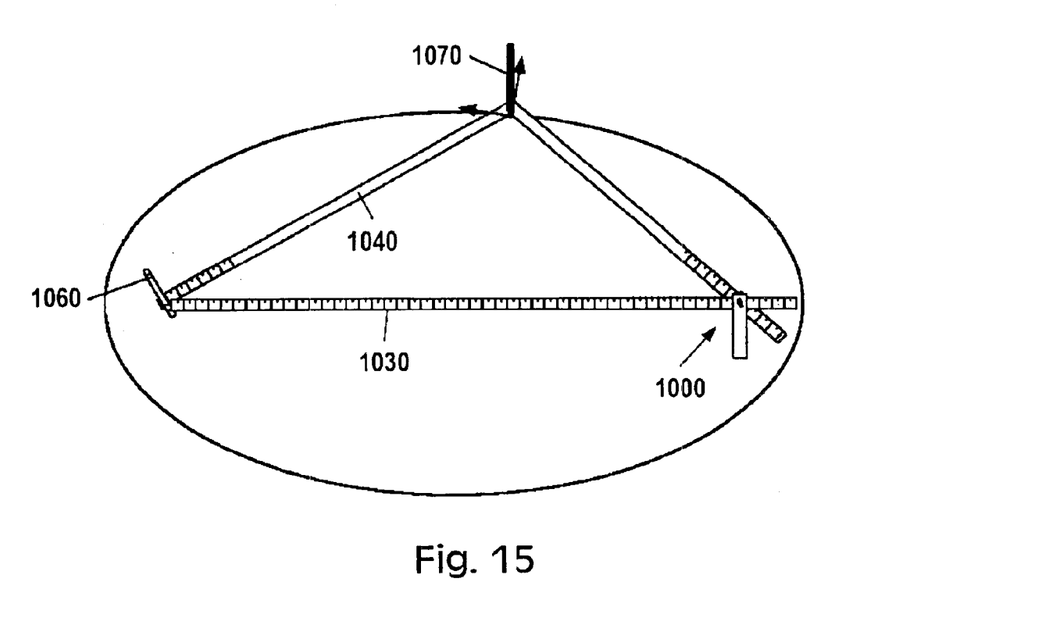
FIG. 15 illustrates the arc-marking step of FIG. 11.

FIG. 11 is a flow chart of a method for using device 1000 to mark out an elliptical arc segment. FIGS. 12–15 illustrate these steps. In step 1110, a rod 1060 is threaded through the starting points of measuring instruments 1030 and 1040 as depicted in FIG. 12. In step 1120, measuring instrument 1030 is pulled to a length equal to the distance between the foci of the ellipse. Clamp 1010 is clamped to that point, as illustrated in FIG. 13. In step 1130, measuring instrument 1040 is pulled to a length equal to the length of the ellipse's major axis. Clamp 1020 is clamped to that point, also as illustrated in FIG. 13. In step 1140, clamp 1010 is joined to clamp 1020, as illustrated in FIG. 14. In step 1150, the rod 1060 is placed at one of two foci of the ellipse, as illustrated in FIG. 15. In step 1160, device 1000 is positioned at the other of the two foci of the ellipse, as illustrated in FIG. 15. Because the beginning-to-clamped portion of measuring instrument 1040 is longer than beginning-to-clamped portion of measuring instrument 1030, it initially lies loose between the rod 1060 and device 1000. In step 1170, the measuring instrument 1040 is drawn tight with an instrument 1070 such as a scribe, thereby positioning the instrument 1070 at a point on the ellipse. In step 1180, a scribe 1070 is moved along and against measuring instrument 1040, while at all times holding measuring instrument 1040 tight, to mark out the desired elliptical arc segment.

It will of course be appreciated that the steps set forth in FIG. 11 do not necessarily have to be done in the described order. It will also be appreciated that additional steps, such as the calibration steps described with respect to FIG. 9, might also be performed in the method of FIG. 12. Because such variations are well within the understanding of those of ordinary skill in the art, the invention should, in all fairness, be understood to encompass such variations.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. A method of approximately field marking an arc of a circle having an obstructed center, the method comprising: identifying an eccentric ellipse that will substantially overlap the arc, the ellipse having a first focus and a second focus, both of which are field accessible and unobstructed; securing a first point of a first line indicating means at or near the first focus; securing a second point of the first line indicating means at or near the second focus while pulling the first line indicating means tight between the first and second points; securing a first point of a second line indicating means at or near the first focus; identifying a second point of the second line indicating means, wherein the second point is located a distance from the first point of the second line indicating means equal to the length of the major axis length of the ellipse; securing the second point of the second line indicating means at or near the second focus; pulling the second line indicating means tight between the first and second points of the second line indicating means in order to mark out where the ellipse substantially overlaps the arc; and using a marking instrument to mark out a plurality of points of the ellipse wherein the ellipse substantially overlaps the arc.

2. The method of claim 1, wherein the first line indicating means is a standard tape measure.

3. The method of claim 2, wherein the second line indicating means is a color-coded tape measure.

4. The method of claim 1, wherein the first line indicating means is a standard tape measure.

5. The method of claim 4, where in the second line indicating means is a standard tape measure.

6. The method of claim 1, wherein the first line indicating means is a measuring instrument.

7. The method of claim 6, wherein the second line indicating means is a measuring instrument.

8. The method of claim 1, wherein the first line indicating means is a string.

9. The method of claim 1, wherein the second line indicating means is a string.

10. The method of claim 1, wherein the marking instrument is a scribe.

11. The method of claim 1, wherein the ellipse's minor axis length is 75% of the radius of the circle.

12. The method of claim 1, wherein the first points of the first and second line indicating means are anchored at or near the focus with a rod.

13. The method of claim 1, wherein the arc is delimited by first and second endpoints separated by a chord, the method further comprising calibrating the placement of the first line by: pulling the second line toward the first endpoint of the arc, and the toward the second endpoint, but not at the same time; and moving the first line indicating means, toward or away from the chord connecting the first and second endpoints of the arc, while keeping the first line indicating means tightly drawn, centered and parallel to the chord, until the first line indicating means is in position wherein the step of pulling the second line indicating means toward either the first or second endpoint will pull the second line indicating means tight.

14. A method of approximately marking an arc on a field using a standard tape measure and a color-coded tape measure, the arc being delimited by two endpoints, the arc being part of a circle having an obstructed center, the method comprising:

identifying coordinates of an eccentric ellipse that will substantially overlap the arc, the ellipse having two foci, both of which are field accessible and unobstructed;

anchoring the starting point of both the standard tape measure and the color-coded tape measure to a first field location;

extending the standard tape measure to a clamping point at the second field location separated from the first field location by a distance equal to the distance between the two foci of the ellipse, wherein the first and second field locations define points on a line running parallel to a chord connecting the endpoints of the arc;

extending the color-coded tape measure to a clamping point at the second field location;

clamping the standard tape measure and the color-coded tape measure to the second field location; and pulling a marking instrument along and against the color-coded tape measure to mark out the arc.

15. The method of claim 14, wherein the starting points are anchored to the field with a rod.

16. The method of claim 14 wherein a device is used to clamp to clamp the standard tape measure and the color-coded tape measure together at the second field location, the device comprising: a first clamp having a first slot to engage the standard tape measure; and a second clamp having a second slot to engage the color-coded tape measure; wherein the second clamp is connected to the first clamp.

17. The method of claim 14, wherein the marking instrument is a scribe.

18. The method of claim 14, further comprising making an approximate determination of where the first and second field locations should be in relation to the arc.

19. The method of claim 18, further comprising calibrating the placement of the first and second field locations by:

pulling the color-coded tape measure toward the first endpoint of the arc, and then toward the second endpoint, but not at the same time; and moving the standard tape measure toward or away from the chord, while keeping the standard tape measure centered and parallel to the chord, until the standard tape measure is in a position where the step of pulling the color-coded tape measure toward either the first or second endpoint will pull the color-coded tape measure tight.

* * * * *